United States Patent

Kaizumi et al.

Patent Number: 5,291,661
Date of Patent: Mar. 8, 1994

[54] PEEPHOLE FOR BUILT-IN LIGHTING FIXTURE AIMING DEVICE

[75] Inventors: Yasuaki Kaizumi, Machida; Shinichi Kojima, Isehara, both of Japan

[73] Assignee: Stanley Electric Co., Ltd., Tokyo, Japan

[21] Appl. No.: 929,173

[22] Filed: Aug. 11, 1992

[30] Foreign Application Priority Data

Aug. 16, 1991 [JP] Japan .................................. 3-72479

[51] Int. Cl.$^5$ ............................................. G01B 11/26
[52] U.S. Cl. ........................................ 33/288; 33/600; 362/66
[58] Field of Search .................. 33/286, 288, 600, 614, 33/645, 244; 362/66; 356/121

[56] References Cited

U.S. PATENT DOCUMENTS 4,669,035  5/1987  Hyde et al. ............................. 362/66
4,675,793  6/1987  Capellari et al. ...................... 362/66

Primary Examiner—William A. Cuchlinski, Jr.
Assistant Examiner—Alvin Wirthlin
Attorney, Agent, or Firm—Louis Weinstein

[57] ABSTRACT

A peephole for a built-in lighting fixture type aiming device. A frame portion projected on an edge portion of an opening portion is formed on the side thereof with an engaging groove, a frame type hook plate is placed in contact with the peripheral edge of a window glass by a spring member and engaged by a hook with the engaging groove provided in the frame portion, and a seal gasket is held by the frame portion and the window glass with the aid of elasticity of the frame type hook plate to provide an airtight construction. The window glass is mounted by the frame type hook plate avoiding the need for a threaded mounting.

5 Claims, 2 Drawing Sheets

PEEPHOLE FOR BUILT-IN LIGHTING FIXTURE AIMING DEVICE

BACKGROUND OF THE INVENTION

1. Field of the Invention

The present invention relates to a headlamp, and more specifically to a peephole provided to read an aiming device, which is called VHAD (Vehicle Headlamp Aiming Device), of a headlamp in which an aiming device is built-in so as to effect external aiming without using an aiming device.

2. Description of the Prior Art

A conventional peephole 90 of this kind is shown in FIGS. 3 and 4. A housing 80 is formed with an opening portion 91 having a circular shape, for example, provided with an externally projecting frame portion 91a and is further provided with bosses 92 at suitable places, for example, at three places. A window glass 93 formed, for example, of transparent resin, is threadedly mounted on the opening portion 91 making use of the bosses 92. In order to secure an airtightness between the opening portion 91 and the window glass 93, a gasket groove 93a is provided at a position in the peripheral edge on the housing 80 side of the window glass 93, and a seal gasket 94 formed from a soft member, for example, such as a rubber member, is fitted therein. The seal gasket 94 is compressed by the frame portion 91a and the window glass 93 through screws 95 to provide an airtight construction.

However, in the aforementioned conventional peephole 90, when it is mounted, it requires an extremely troublesome work, for example, threaded mounting by use of three screws 95.

Further, when the built-in aiming device does not display a predetermined value during the shipment inspection of headlamps, it is necessary to remove the window glass 93 of the peephole 90 to readjust the aiming device. In this case, in the peephole 90 constructed as described above, it takes much time to mount and remove it, giving rise to a problem in that a working efficiency in the production line of headlamps is impaired.

SUMMARY OF THE INVENTION

For solving the above-described problems noted above with respect to prior art, the present invention provide a peephole for a built-in lighting fixture type aiming device in which a window glass formed from a transparent member is mounted, with a seal gasket held to provide an airtight construction, on an opening portion provided in a housing in order to read a graduation of an aiming device built-in a lighting fixture, characterized in that a frame portion projected on an edge portion of said opening portion is formed on the side thereof with an engaging groove, a frame type hook plate is placed in contact with the peripheral edge of said window glass by a spring member and engaged by a hook with the engaging groove provided in said frame portion, and said seal gasket is held by said frame portion and said window glass with the aid of elasticity of said frame type hook plate to provide an airtight construction. With this arrangement, the mounting work of the peephole is facilitated.

DESCRIPTION OF THE PREFERRED EMBODIMENT

Figure 1:
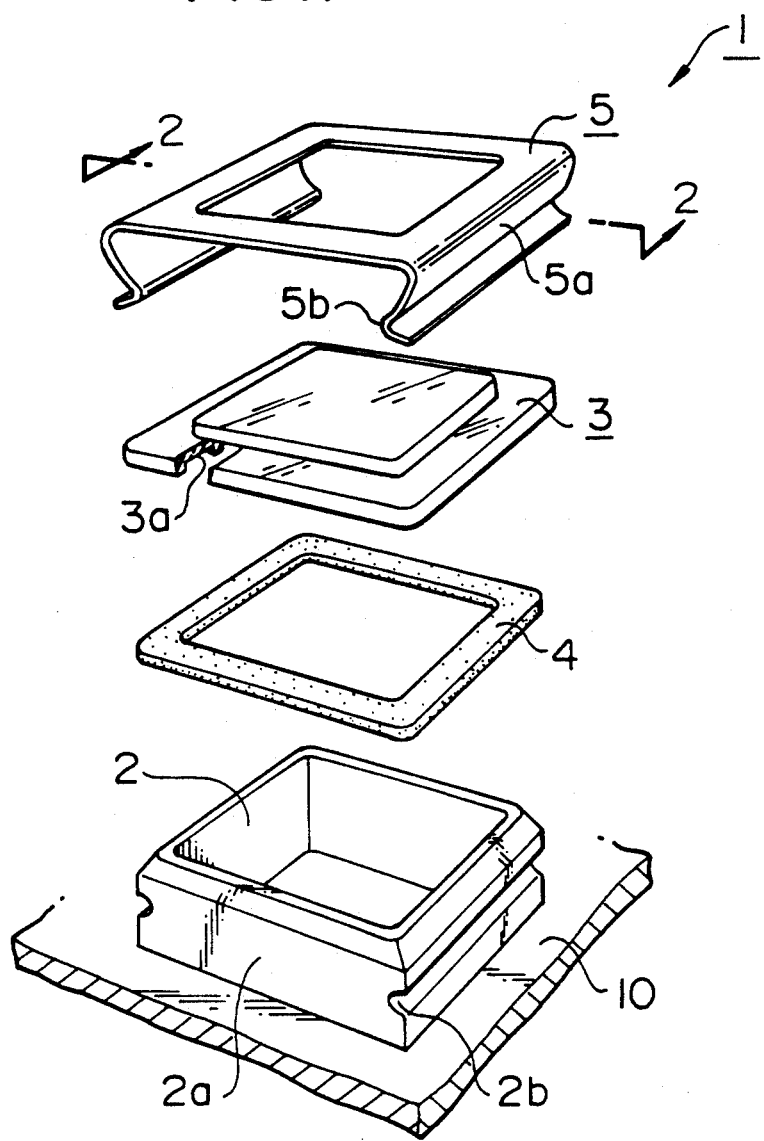
FIG. 1 is a perspective view showing one embodiment of a peephole of a built-in lighting fixture type aiming device.
Figure 2:
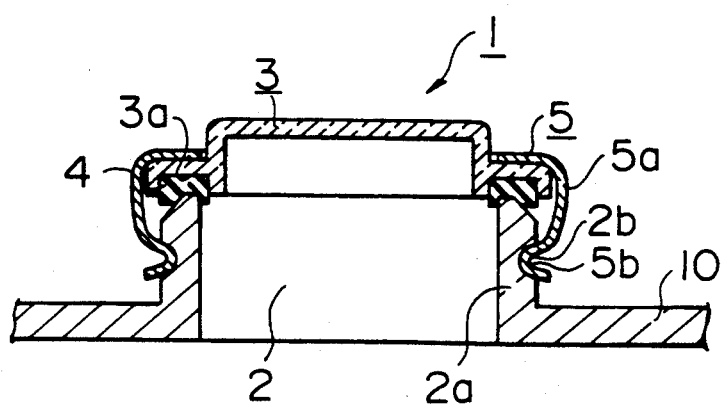
FIG. 2 is a sectional view taken on line 2—2 of FIG. 1.
Figure 3:
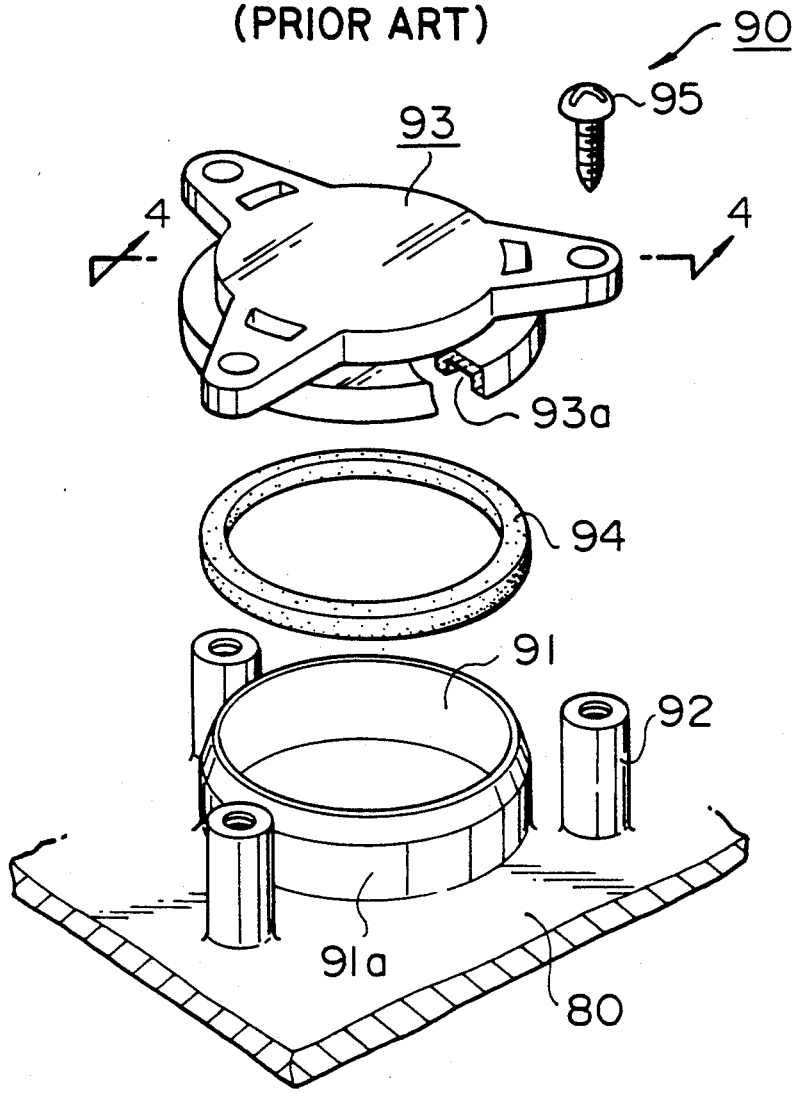
FIG. 3 is a perspective view showing a conventional peephole.
Figure 4:
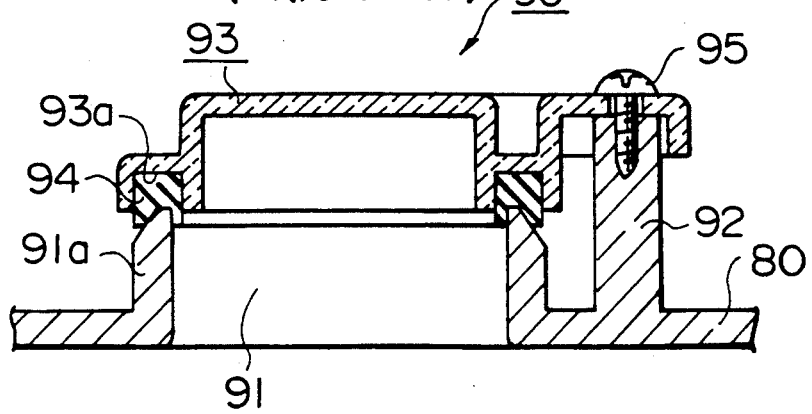
FIG. 4 is a sectional view taken along line 4—4 of FIG. 3.

In FIGS. 1 and 2, reference numeral 1 denotes a peephole according to the present invention. In this peephole 1, a window glass 3 is mounted on an opening portion 2 provided in a housing 10 so as to hold a seal gasket 4 thereby to provide an airtight construction, similar to the conventional example of FIG. 3 as previously described. However, according to the present invention, the window glass 3 is not threadedly mounted as in the conventional example but is mounted by a frame type hook plate 5, thereby enabling simplification of the mounting step.

The configuration of the present invention will be further described in detail. First, the opening portion 2 provided in the housing 10 has a suitable shape, for example, such as a square, and engaging grooves 2b parallel with the window glass 3 are provided on external sides of two opposed surfaces of a frame portion 2a.

The window glass 3 has a shape corresponding to the opening portion 2, a gasket groove 3a is formed in the peripheral edge on the housing 10 side, and a seal gasket 4 formed from a rubber member is fitted therein, similarly to the conventional example. However, in this embodiment, no hole for threaded mounting is provided which has been provided in the conventional example.

In the present invention, a frame type hook plate 5 is employed in place of the aforementioned threaded mounting. The frame type hook plate 5 is formed from a member which is rich in spring property such as a steel plate and formed into a frame so that a necessary portion of the window glass 3 is open and is further formed with a leg portion 5a of which opposite ends are bent into a substantially ⊐-shape i.e. C-shape, said leg portion 5a having a hook 5b formed at an extreme end thereof.

In the thus configured peephole I of the present invention, the window glass 3 with the seal gasket 4 fitted in the gasket groove 3a is placed at a predetermined position on the frame portion 2a of the opening portion 2, and after this, the window glass 3 is further pressed by the frame-like hook plate 5 so as to cover the window glass 3 whereby the seal gasket 4 is compressed by the elasticity thereof and the hook 5b is engaged with the engaging groove 2b to fix the window glass 3.

It is to be noted that a suitable configuration may be employed. For example, the engaging groove 2b is designed to have a sufficient depth so that the hook 5b is completely fitted therein. With this, the disengagement between the engaging groove 2b and the hook 5b is rendered difficult unless an exclusive-use tool is used. If this configuration is employed, there can be prevented a trouble such that the window glass 3 is unexpectedly removed in the market so that the aiming unit is put out of order. In addition, this is preferable in terms of guarantee on the performance of the apparatus.

As described above, according to the present invention, there is provided a peephole in which a frame portion projected on an edge portion of the opening portion is formed on the side thereof with an engaging groove, a frame type hook plate is placed in contact with the peripheral edge of the window glass by a spring member and engaged by a hook with the engaging groove provided in the frame portion, and the seal gasket is compressed and held by the frame portion and the window glass. With this arrangement, the peephole can be mounted by the simple step, i.e., the pressing of the frame type hook plate, thus simplifying the mounting step. Further, in the assembly line of the lighting fixture of this kind and even in the thereafter adjustment line, the steps are simplified.

What is claimed is:

1. A peephole for a built-in lighting fixture type aiming device comprising:
    a housing having a peephole opening;
    a projection surrounding said opening, said projection having an external surface provided with engaging grooves on opposite sides of said external surface;
    a transparent member;
    a sealing gasket having a shape substantially conforming to a shape of a free end of said projection surrounding said peephole;
    said transparent member having a marginal portion substantially conforming to the shape of said gasket for receiving said gasket;
    a frame-shaped hook plate having a central opening of a shape substantially conforming to said peephole opening and at least first and second integral locking legs extending downwardly from said frame and provided with a recess engaging portion for engaging said recess;
    said transparent member being positioned between said hook plate and said gasket;
    said frame member compressing said gasket when the recess engaging portions of said locking legs are each engaged in an associated one of said recesses; and
    the frame-shaped member being formed of a springy material which serves to retain the locking legs in engagement with said recesses.

2. The apparatus of claim 1 wherein said springy material is steel.

3. The apparatus of claim 1 wherein said frame-shaped member has a substantially rectangular shape and said legs are arranged along opposite parallel sides of said frame-shaped member.

4. The apparatus of claim 1 wherein said marginal portion of said transparent member is provided with a recess for receiving and seating said gasket.

5. The apparatus of claim 1 wherein said legs extend substantially downwardly from said frame-shaped member and free ends thereof comprising said recess engaging portions are bent inward to form a substantially C-shaped configuration to define a bent portion which extends into an associated one of said recesses.

* * * * *

UNITED STATES PATENT AND TRADEMARK OFFICE
CERTIFICATE OF CORRECTION

PATENT NO. : 5,291,661
DATED : March 8, 1994
INVENTOR(S) : Kaizumi et al.

It is certified that error appears in the above-indentified patent and that said Letters Patent is hereby corrected as shown below:

Column 1, line 12, delete "external"

Column 1, line 13, after "an" insert --external--

Column 1, line 51, change "provide" to --provides--

Column 2, line 49, change "peephole I" to --peephole 1--

Signed and Sealed this

Twelfth Day of July, 1994

Attest:

BRUCE LEHMAN

Attesting Officer        Commissioner of Patents and Trademarks